(12) United States Patent
Ooba et al.

(10) Patent No.: US 10,124,540 B2
(45) Date of Patent: Nov. 13, 2018

(54) THREE-DIMENSIONAL MODELED OBJECT AND SUPPORT FORMING METHOD

(71) Applicant: CMET INC., Kanagawa-ken (JP)

(72) Inventors: Yoshikazu Ooba, Kanagawa-ken (JP); Koukichi Suzuki, Kanagawa-ken (JP); Yuuya Daicho, Kanagawa-ken (JP)

(73) Assignee: CMET INC., Kanagawa (JP)

( * ) Notice: Subject to any disclaimer, the term of this patent is extended or adjusted under 35 U.S.C. 154(b) by 152 days.

(21) Appl. No.: 14/901,487

(22) PCT Filed: Jun. 27, 2014

(86) PCT No.: PCT/JP2014/067225
§ 371 (c)(1),
(2) Date: Dec. 28, 2015

(87) PCT Pub. No.: WO2014/208743
PCT Pub. Date: Dec. 31, 2014

(65) Prior Publication Data
US 2016/0368224 A1    Dec. 22, 2016

(30) Foreign Application Priority Data

Jun. 28, 2013 (JP) .................................. 2013-137173

(51) Int. Cl.
*B29C 67/00* (2017.01)
*B22F 3/00* (2006.01)
*B22F 3/105* (2006.01)
*B33Y 10/00* (2015.01)
(Continued)

(52) U.S. Cl.
CPC .......... *B29C 67/0092* (2013.01); *B22F 3/008* (2013.01); *B22F 3/1055* (2013.01); *B29C 67/0077* (2013.01); *B29C 67/0081* (2013.01); *B33Y 10/00* (2014.12); *B33Y 30/00* (2014.12); *B33Y 80/00* (2014.12); *B22F 2003/1058* (2013.01); *Y02P 10/295* (2015.11)

(58) Field of Classification Search
CPC .................................................... B29C 67/0092
USPC ............................................................ 428/98
See application file for complete search history.

(56) References Cited

U.S. PATENT DOCUMENTS

2002/0171177 A1    11/2002   Kritchman et al.
2004/0239009 A1 *  12/2004   Collins .................. B33Y 30/00
                                                              264/497
2012/0113439 A1     5/2012   Ederer

FOREIGN PATENT DOCUMENTS

EP    1 486 318 A2    12/2004
JP    H08-025487       1/1996
JP    2000-309057 A   11/2000
(Continued)

OTHER PUBLICATIONS

Extended European Search Report as issued in European Patent Application No. 14816566.5, dated Dec. 13, 2016.
(Continued)

*Primary Examiner* — Brent T O'Hern
(74) *Attorney, Agent, or Firm* — Pillsbury Wilthrop Shaw Pittman, LLP

(57) ABSTRACT

The present invention is a three-dimensional modeled object including: a shaping material which is layered on a fabrication table; a modeled article which is formed inside the shaping material; and a support which is formed inside the shaping material and is formed with a predetermined gap with respect to the modeled article.

12 Claims, 12 Drawing Sheets

(51) Int. Cl.
    *B33Y 30/00*    (2015.01)
    *B33Y 80/00*    (2015.01)

(56) References Cited

FOREIGN PATENT DOCUMENTS

| JP | 2004-358968 A | 12/2004 |
| JP | 2013-184405 A | 9/2013 |

OTHER PUBLICATIONS

International Search Report as Issued in International Patent Application No. PCT/JP2014/067225, dated Sep. 22, 2014.

\* cited by examiner

THREE-DIMENSIONAL MODELED OBJECT AND SUPPORT FORMING METHOD

CROSS-REFERENCE TO RELATED APPLICATIONS

This application is the U.S. National Stage of PCT/JP2014/067225, filed Jun. 27, 2014, which in turn claims priority to Japanese Patent Application No. JP 2013-137173, filed Jun. 28, 2013. The contents of these applications are incorporated herein by reference in their entireties.

TECHNICAL FIELD

Embodiments described in the specification relate to a three-dimensional modeled object and a support forming method.

BACKGROUND ART

In recent years, a three-dimensional layered modeling apparatus (a so-called 3D printer) that uses a laser beam lithography method, a powdery molding method, or a FDM method (Fused Deposition Modeling) has attracted attention.

In the three-dimensional layered modeling apparatus, there is also known a method of shaping a support (a support member) that supports a modeled article so that the modeled article is not deformed when the modeled article (model) is formed. After the shaping process ends, the support is detached and discarded.

Specifically, as the laser beam lithography method, for example, light (for example, a UV laser) which is controlled by a computer so as to obtain a desired pattern is selectively irradiated to a liquid surface of a liquid light curable resin (a fluid material) charged in a molding bath so as to cure the light curable resin. Further, light curable resin for one layer is supplied onto the cured layer, light is irradiated thereto again so as to cure the light curable resin, and the same process is repeated so as to form a desired modeled article.

In the laser beam lithography method using such a liquid light curable resin, there is a concern that an undercut or a deformation may occur in, for example, an overhanging portion of a modeled article in that a portion cured by light cannot be supported by non-cured resin.

Here, for example, in the three-dimensional layered modeling apparatus using the laser beam lithography method, since the fluid material is used in general, a support that supports the overhanging portion cured by the irradiation of light needs to be provided. Further, there is a need of providing a support in order to prevent a problem in which the modeled article is fixed to a fabrication table.

In this manner, for example, in the three-dimensional layered modeling apparatus using the laser beam lithography method, the support is essential. However, since the support is an obstacle by nature, it is desirable to shape the support so that the support is small and is easily detachable.

Further, in the three-dimensional layered modeling apparatus using the FDM method, for example, a string-shaped thermoplastic resin is melted by a heater inside a shaping head, the injection of the melted thermoplastic resin is controlled, and the resin is laminated and shaped by the elevation of a fabrication table.

Even in the three-dimensional layered modeling apparatus using the FDM method, the modeled article is bent due to the weight thereof depending on the shape of the modeled article. For this reason, for example, there is a need of providing a material (a support material) for forming a support in addition to a material (a model material) of the modeled article.

In the three-dimensional layered modeling apparatus using the FDM method, since the resin (string-shaped resin) can be generally used, the resin can be easily detached. However, for example, when the support is provided in a portion where a processing is difficult, there is a case in which the support is not easily detachable.

Moreover, for example, an alkali solution is used to remove the support in a melted state. However, in this method, the operation is troublesome and the treatment of the alkali solution can involve danger.

Incidentally, as a related art, various proposals are made as the support forming technique used when the modeled article is formed by the three-dimensional layered modeling apparatus.

CITATION LIST

Patent Literature

Patent Literature 1: WO 09/136047
Patent Literature 2: JP H08-025487 A
Patent Literature 3: JP 2000-309057 A

SUMMARY OF INVENTION

Technical Problem

As described above, in the general three-dimensional layered modeling apparatus using the laser beam lithography method, the support is indispensably used. On the contrary, a three-dimensional layered modeling apparatus has been proposed, employing the laser beam lithography method, in which a non-fluid light curable resin is used.

In the three-dimensional layered modeling apparatus using the laser beam lithography method using the non-fluid light curable resin, for example, when the modeled article is formed by the liquid light curable resin having a predetermined melting temperature, the light curable resin of the layer cured by the irradiation of light is maintained in a solid state at a temperature lower than a melting temperature, the light curable resin for one layer is supplied onto the top surface thereof, and the light curable resin is irradiated by light, thereby preventing a deformation such as an undercut in the modeled article. In addition, the solid state indicates a non-fluid state. For example, a wax state, a jelly state, and a sol state are included.

However, in the three-dimensional layered modeling apparatus, for example, the light curable resin is used in the non-fluid state at the temperature lower than the melting temperature. However, for example, in a case where the modeled article has a large shape and a heavy weight and the modeled article is depressed even by the non-fluid light curable resin or a case where a deformation such as bending occurs due to the internal stress generated during a shaping process, a problem may arise.

Moreover, when the post-process of the modeled article is automatically performed, the modeled article has an unstable shape, or the modeled articles are formed in an overlapping state in the height direction (the Z direction) similarly to a three-dimensional layered modeling apparatus using a powdery molding method to be described below, various problems may arise.

That is, in the three-dimensional layered modeling apparatus using the powdery molding method, for example, the three-dimensional layered modeling apparatus using the powder sintering method, the powder melting method, or the powder bed and inkjet head 3D printing method, the powder resists the depression or the movement of the modeled article, and hence the support is not necessarily required in principle.

However, for example, when the post-process of the modeled article is automatically performed, the modeled article has an unstable shape, or the modeled articles are formed in an overlapping state in the height direction, there is a concern of damage caused by the contacting of the modeled article s or the falling of the modeled article s when the powder (for example, sand, metallic powder, gypsum, starch, artificial bone, and plastic powder) is removed.

Moreover, for example, if the modeled article has a large shape and a heavy weight or the modeled article s exist even when the post-process is not automatically performed, a worker who removes the powder needs to handle the modeled article while avoiding the damage and hence gets a large burden. Further, for example, when the modeled article has a large shape and a heavy weight, there is a concern that the modeled article may be depressed even by the non-fluid powder and a deformation such as bending may occur due to the internal stress generated during a shaping process.

The embodiment is to provide a three-dimensional modeled object and a support forming method capable of appropriately supporting a modeled article by a three-dimensional layering shaping technique.

In addition, in the specification, the three-dimensional modeled object indicates, for example, an entire object including the modeled article, the support, and the powder which is left while not being sintered or melted by a laser or a thermal head and to which the binding agent is not applied inside the fabrication tank of the three-dimensional layered modeling apparatus when the modeled article is formed by the powdery molding method. In this case, the desired modeled article can be obtained by removing, for example, the support and the powder from the three-dimensional modeled object formed inside the fabrication tank.

Further, in the specification, the three-dimensional modeled object indicates, for example, an entire object including the modeled article, the support, and the non-fluid shaping material (if necessary, the fluid shaping material) such as light curable resin which is left while not being cured by light inside the fabrication tank of the three-dimensional layered modeling apparatus when the modeled article is formed by the non-fluid material such as light curable resin kept at a temperature lower than a melting temperature. In this case, for example, the desired modeled article can be obtained by removing the support and the non-fluid (and the fluid) shaping material from the three-dimensional modeled object formed inside the fabrication tank.

Solution to Problem

According to a first embodiment of the invention, provided is a three-dimensional modeled object including: a shaping material which is layered on a fabrication table; a modeled article which is formed inside the shaping material; and a support which is formed inside the shaping material and is formed with a predetermined gap with respect to the modeled article.

Further, according to a second embodiment of the invention, provided is a support forming method of a three-dimensional layered modeling apparatus that carries out repeatedly a process of coating one layer of a shaping material onto a fabrication table and a process of forming one layer of a modeled article by processing the coated shaping material, wherein when one layer of the modeled article is formed, a support is formed with a predetermined gap with respect to the modeled article.

Advantageous Effects of Invention

The three-dimensional modeled object and the support forming method disclosed herein have an effect that the modeled article can be formed while being appropriately supported. Further, according to the three-dimensional modeled object and the support forming method disclosed herein, for example, it is possible to reduce the damage of the modeled article when the post-process of the modeled article is automatically performed, the modeled article has an unstable shape, or the modeled articles are formed in an overlapping state in the height direction. Further, it is possible to reduce a burden on a worker who acquires the modeled article or removes the non-fluid material even when the post-process is not automatically performed.

DESCRIPTION OF EMBODIMENTS

First, prior to the description of the embodiments of a three-dimensional modeled object and a support forming method according to the invention, an example of a three-dimensional layered modeling apparatus using a powdery molding method, a three-dimensional modeled object formed by the three-dimensional layered modeling apparatus, and a problem thereof will be described with reference to FIGS. 1 and 2A and 2B.

Figure 1:
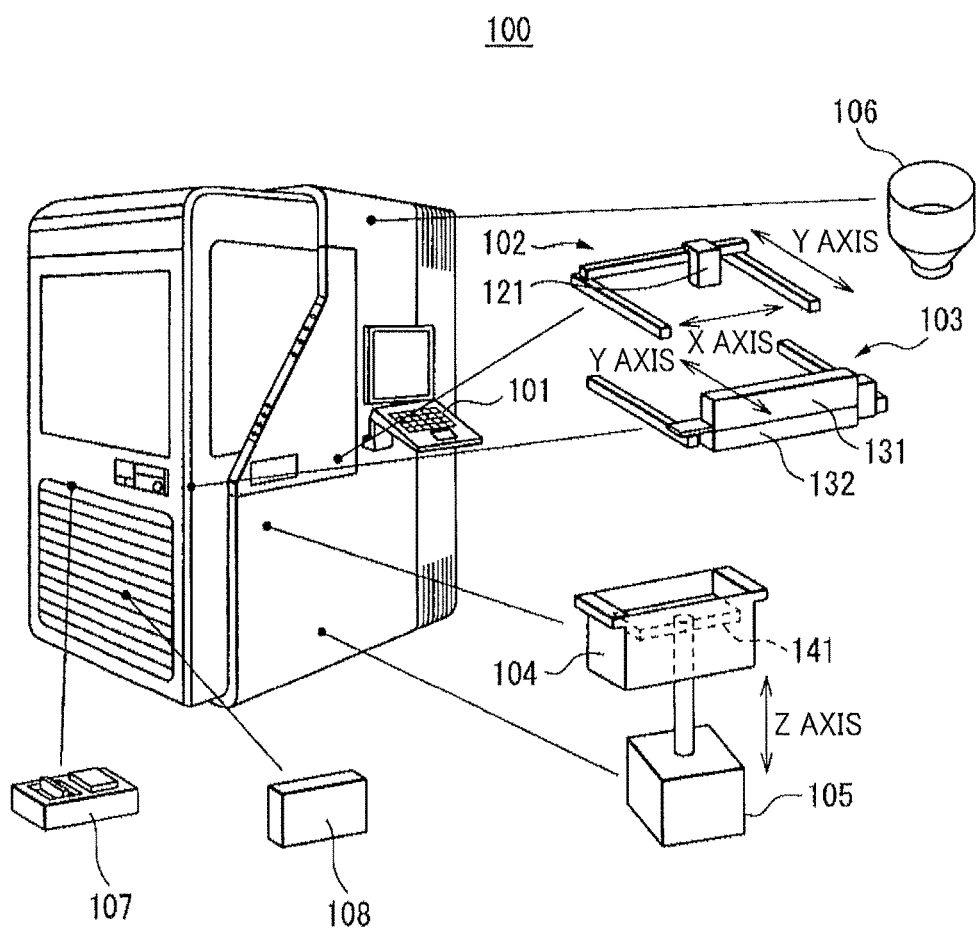
FIG. 1 is a perspective view schematically illustrating an example of a three-dimensional layered modeling apparatus.

FIG. 1 is a perspective view schematically illustrating an example of a three-dimensional layered modeling apparatus and illustrating an example of a three-dimensional layered modeling apparatus 100 that adopts a powdery molding method.

As illustrated in FIG. 1, a three-dimensional layered modeling apparatus 100 includes a control computer 101, a print head unit 102, a recoater unit 103, a fabrication tank 104, an elevation device 105, a powder supply hopper unit 106, a cleaning unit 107, and a chemical unit 108. Here, the fabrication tank 104 is provided with a fabrication table 141 which is controlled by the elevation device 105 in the Z-axis direction (the height direction).

When three-dimensional data (for example, STL data Standard Triangulated Language Data) is inputed to the control computer 101, a slice process or an offset process and a bitmap conversion process are performed on the data so as to control the three-dimensional layered modeling apparatus 100.

The print head unit 102 applies (ejects) a binding agent (a binder) onto a surface of powder on the fabrication table 141 based on, for example, bitmap data so as to shape one layer. Further, the print head unit 102 is provided with, for example, a plurality of inkjet heads each having a plurality of ejection nozzles.

Here, for example, the print head unit 102 applies a binding agent onto the surface of the powder on the fabrication table 141 while moving the printer head 121 in the X-axis direction (the left and right direction when viewed from the front side of the apparatus).

Further, when the application operation for one row in the X-axis direction ends, the printer head 121 is moved in the Y-axis direction (the front to rear direction when viewed from the front side of the apparatus), and the printer head 121 is moved again in the X-axis direction while applying the binding agent. By carrying out repeatedly such a process, one layer is shaped.

Further, the printer head 121 may be configured as, for example, a line head having an entire length of the fabrication table 141 in the X-axis direction. In this case, the binding agent can be applied onto the entire surface of the powder on the fabrication table 141, that is, one layer shaping process can be performed only by the movement of the printer head 121 in the Y-axis direction.

Then, when one layer shaping process on the entire surface of the powder on the fabrication table 141 ends, for example, the fabrication table 141 is moved downward in the Z-axis direction (the height direction) by the elevation device 105 and a powder coating process for one layer is performed while the recoater unit 103 is moved in the Y-axis direction.

Here, the recoater unit 103 includes, for example, a recoater hopper 131 and a vibration blade 132. The recoater hopper 131 stores powder supplied from the powder supply hopper unit 106.

The vibration blade 132 is operated when the recoater unit 103 moves in the Y-axis direction, and the powder is densely supplied onto the fabrication table 141 so as to be horizontal (in the X-Y plane) during the movement of the recoater unit 103. Further, the elevation device 105 is controlled so that the downward movement amount (the height) of the fabrication table 141 matches the thickness (the lamination pitch) of the powder coated by the recoater unit 103.

By repeating the above-described processes, a final modeled article is completed inside the fabrication tank 104. That is, for example, a three-dimensional modeled object including a desired modeled article, a support, and a remaining powder to which a binding agent is not applied is formed inside the fabrication tank 104.

Here, the fabrication tank 104 is moved by, for example, a fabrication tank transfer unit to the outside of the three-dimensional layered modeling apparatus 100, the support and the powder which are not necessary are automatically and manually removed from the three-dimensional modeled object, and the desired modeled article is extracted.

The cleaning unit 107 is used to remove the extra binding agent or the extra powder of the printer head 121. Further, the chemical unit 108 is used to store a chemical (a binding agent or a cleaning agent) used in the shaping process, the binding agent is supplied to the printer head 121, and the cleaning agent is supplied to the cleaning unit 107. Further, the cleaning agent is used to clean, for example, the inside or the ejection port of the printer head or is charged into the printer head so that the printer head is not dried and degraded in a non-use state.

In addition, the three-dimensional layered modeling apparatus 100 is also provided with a waste water tank (not illustrated) which collects waste water produced by the cleaning unit 107 and an air pressure control unit (not illustrated) which is used to eject a binding agent or a cleaning agent.

Here, FIG. 1 illustrates a simple example of a three-dimensional layered modeling apparatus using a powdery molding method. Here, the application of the embodiment is not limited to the example illustrated in FIG. 1. For example, the three-dimensional modeled object and the support forming method by the three-dimensional layered modeling apparatus using the powdery molding method will be described.

That is, the embodiment can be applied as the three-dimensional modeled object and the support forming method by the three-dimensional layered modeling apparatus using, for example, various powdery molding methods such as a powder sintering method, a powder melting method, or a powder bed and inkjet head 3D printing method. Further, various modeled article s (models) may also exist. Here, for example, it is needless to say that sand as powder is used to form a mold as a modeled article.

Further, the embodiment is not limited to the three-dimensional layered modeling apparatus using the powdery molding method. For example, the embodiment is also applied to the three-dimensional modeled object and the support forming method by the three-dimensional layered modeling apparatus using a laser beam lithography method using a non-fluid light curable resin. That is, the embodiment is widely applied to the three-dimensional modeled object and the support forming method by the three-dimensional layered modeling apparatus forming the modeled article using a non-fluid material including powder, wax, jelly, or sol as a shaping material.

Incidentally, as described above, even in the three-dimensional layered modeling apparatus that forms the modeled article by using the non-fluid material as the shaping material, it is preferable to use a support that prevents damage caused by the contacting of the modeled article s or the falling of the modeled articles when the non-fluid material is removed, prevents deformation such as bending caused by internal stress generated during a shaping process, or reduces a burden on a worker who removes the non-fluid material in the cases where the post-process of the modeled article is automatically performed, the modeled article has an unstable shape, and the modeled article s are formed in an overlapping state in the height direction.

Figure 2A:
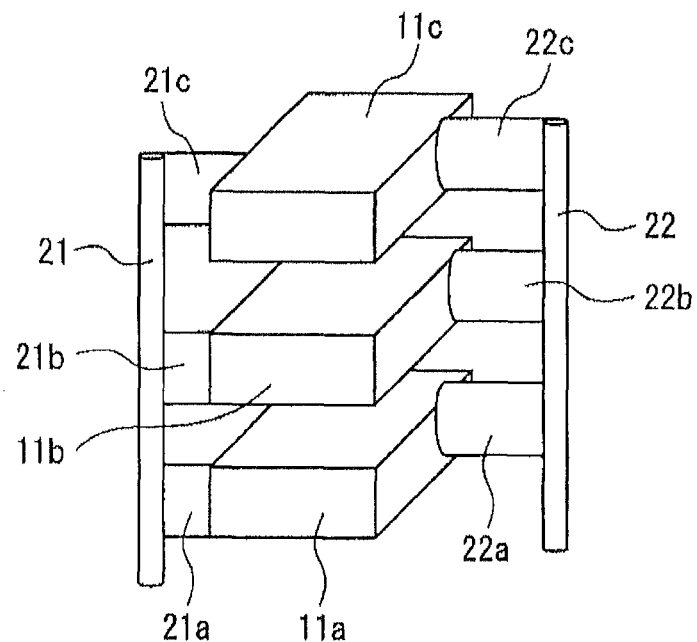
FIGS. 2A and 2B are diagrams illustrating an example of a three-dimensional modeled object.
Figure 2B:
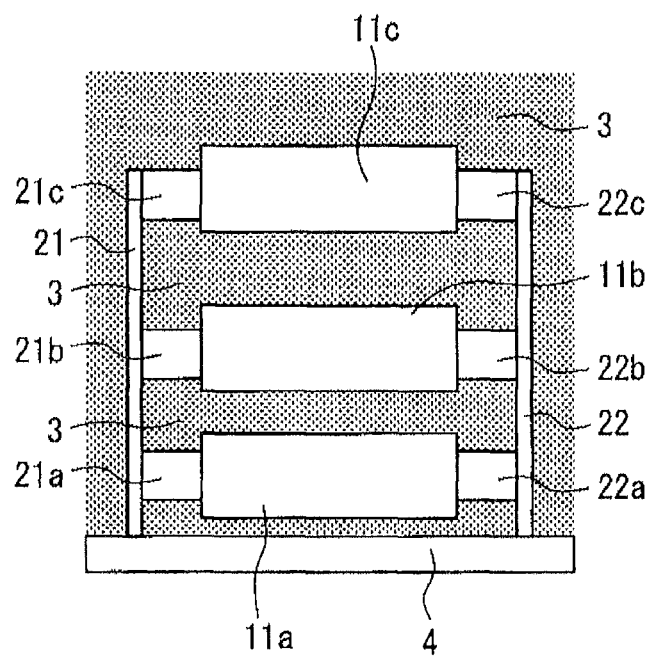

FIGS. 2A and 2B are diagrams illustrating an example of the three-dimensional modeled object, where FIG. 2A is a perspective view illustrating the modeled article and the support of the three-dimensional modeled object and FIG. 2B is a front view illustrating the three-dimensional modeled object.

In FIGS. 2A and 2B, Reference Numerals 11a to 11c indicate modeled articles (models), Reference Numerals 21 and 22 indicate supports (support members), Reference Numerals 21a to 21c and the support 22 indicate connection portions of the supports 21 and 22, and Reference Numerals 4 indicates a fabrication table.

In addition, Reference Numeral 3 indicates, for example, powder which is left and to which the binding agent is not applied, that is, powder which is not used for the modeled article and the support. Here, FIGS. 2A and 2B illustrate, for example, a case where three desired rectangular parallelepiped modeled articles 11a to 11c are formed by the three-dimensional layered modeling apparatus 100 illustrated in FIG. 1.

As illustrated in FIG. 2A, for example, when three rectangular parallelepiped modeled article s 11a to 11c are formed, the modeled articles 11a to 11c are integrally formed with the supports 21 and 22 through the connection portions 21a to 21c and 22a to 22c.

That is, as illustrated in FIG. 2B, for example, the three-dimensional modeled object formed inside the fabrication tank 104 of the three-dimensional layered modeling apparatus 100 illustrated in FIG. 1 includes the modeled articles 11a to 11c and the supports 21 and 22 (21a to 21c, 22a to 22c) illustrated in FIG. 2A and the powder 3 thereof.

Accordingly, for example, even when the powder 3 is removed from the three-dimensional modeled object illustrated in FIG. 2B, it is possible to prevent damage caused by the contacting of three modeled articles 11a to 11c formed in the height direction.

However, when the modeled articles 11a to 11c and the supports 21 and 22 (21a to 21c, 22a to 22c) are integrally formed with each other, the modeled article s 11a to 11c need to be detached from the support. Thus, for example, in the three-dimensional layered modeling apparatus using the melting of the metallic powder, a metal portion between the modeled article and the support needs to be cut.

Hereinafter, an embodiment of the three-dimensional modeled object and the support forming method according to the invention will be described with reference to the accompanying drawings. In the description below, the three-dimensional modeled object and the support forming method by the three-dimensional layered modeling apparatus using the powdery molding method will be mainly described, but the application of the invention is not limited thereto. That is, the invention is widely applied to, for example, the three-dimensional modeled object and the support forming method by the three-dimensional layered modeling apparatus that forms the modeled article by using the non-fluid material as the shaping material.

In addition, in the three-dimensional modeled object and the support forming method by the three-dimensional layered modeling apparatus using various powdery molding methods such as a powder sintering method, a powder melting method, and a powder bed and inkjet head 3D printing method, various modeled articles (models) can be formed. For example, it is needless to say that a mold can be shaped as a modeled article by using powder such as sand, a metallic powder, gypsum, starch, artificial bone, and plastic powder.

Figure 3A:
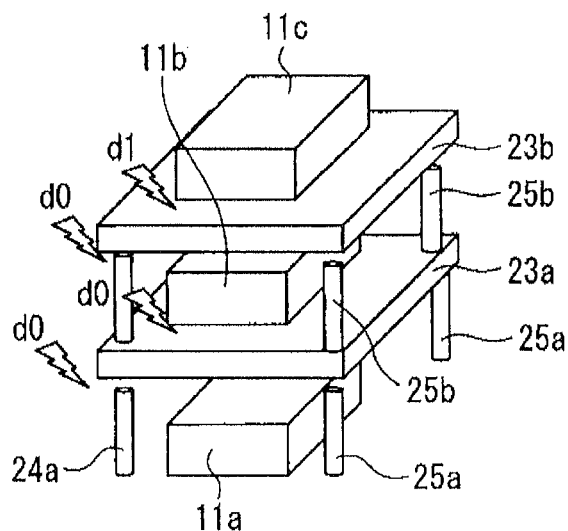
FIGS. 3A to 3C are diagrams illustrating a first embodiment of the three-dimensional modeled object according to the invention.
Figure 3B:
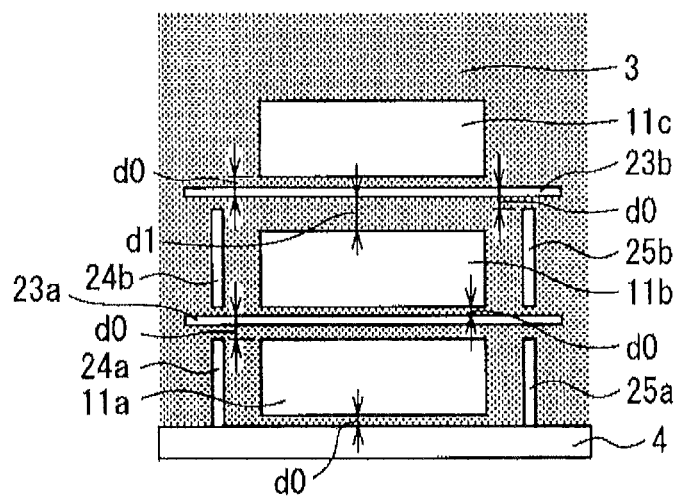
Figure 3C:
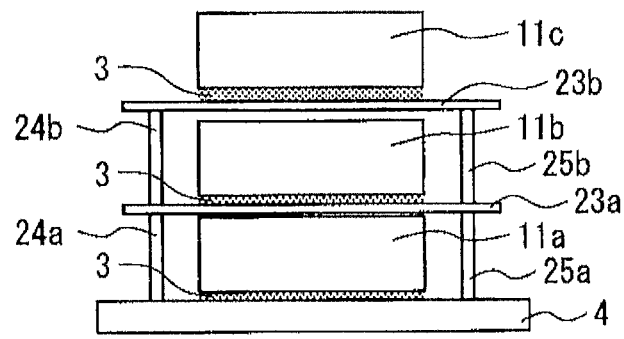

FIGS. 3A to 3C are diagrams illustrating a first embodiment of the three-dimensional modeled object according to the invention, where FIG. 3A is a perspective view illustrating the modeled article and the support in the three-dimensional modeled object and FIG. 3B is a front view illustrating the three-dimensional modeled object. In addition, FIG. 3C illustrates a case where most of powder is removed from the three-dimensional modeled object illustrated in FIG. 3B by, for example, a powder suction device.

In FIGS. 3A to 3C, Reference Numerals 11a to 11c indicate rectangular parallelepiped modeled article s, Reference Numerals 23a and 23b indicate plate-shaped supports, Reference Numerals 24a, 24b, 25a, and 25b indicate columnar supports, and Reference Numeral 4 indicates a fabrication table.

In addition, Reference Numeral 3 indicates, for example, powder which is left and to which the binding agent is not applied, that is, powder which is not used for the modeled article and the support. Further, the columnar supports 24a, 25a, 24b, and 25b are provided at four corners so as to support the plate-shaped supports 23a and 23b.

As illustrated in FIG. 3A, in the three-dimensional modeled object of the first embodiment, for example, three rectangular parallelepiped modeled article s 11a to 11c are formed in a shelf shape by the plate-shaped supports 23a and 23b and the columnar supports 24a, 24b, 25a, and 25b. In addition, a gap (d0 and d1) is formed among the plate-shaped supports 23a and 23b, the modeled article s 11a to 11c, and the columnar supports 24a, 24b, 25a, and 25b.

That is, as illustrated in FIG. 3B, for example, the three-dimensional modeled object formed inside the fabrication tank 104 of the three-dimensional layered modeling apparatus 100 illustrated in FIG. 1 forms the modeled article 11a and the columnar supports 24a and 25a between the fabrication table 4 and the plate-shaped support 23a and forms the modeled article 11b and the columnar supports 24b and 25b between the plate-shaped support 23a and the plate-shaped support 23b. Further, the modeled article 11c is formed above the plate-shaped support 23b.

Here, the gap d0 corresponding to one to several powder layers (for example, 1 mm or less) coated by, for example, the recoater unit 103 described by referring to FIG. 1 is formed between the top surface of the fabrication table 4 and the bottom surface of the modeled article 11a, between the top surface of the plate-shaped support 23a and the bottom surface of the modeled article 11b, and between the top surface of the plate-shaped support 23b and the bottom surface of the modeled article 11c.

Incidentally, for example, when the binding agent (the binder) is ejected from the inkjet head, several layers may be bound instead of only one powder layer to be coated depending on the type of the powder or the binding agent. Further, even when the modeled article is formed by sintering or melting the powder, several layers may be sintered or melted instead of only one layer.

For that reason, a gap corresponding to several powder layers can be suppressed by forming an offset layer through an offset process in the height direction (the Z-axis direction) between the top surface of the fabrication table 4 and the bottom surface of the modeled article 11a or between the top surface of the plate-shaped support 23a and the bottom surface of the modeled article 11b.

Further, the gap d0 is formed among the top surface of the modeled article 11a, the top surfaces of the columnar supports 24a and 25a, and the bottom surface of the plate-shaped support 23b and between the top surfaces of the columnar supports 24b and 25b and the bottom surface of the plate-shaped support 23b.

Moreover, for example, the gap d1 larger than the gap d0 is formed between the top surface of the modeled article 11b and the bottom surface of the plate-shaped support 23b. Thus, for example, powder not having a binding agent applied thereto is formed in the gaps d0 and d1.

In addition, the gaps d0 and d1 can be changed variously depending on the shape or the size of the modeled article. For example, when the gap d0 is equal to or smaller than about 1 mm, there is no need of worrying the dropping or the falling of the modeled article or the support.

Then, for example, when most of powder is removed from the three-dimensional modeled object illustrated in FIG. 3B by using, for example, a powder suction device, a product illustrated in FIG. 3C is obtained. That is, in FIG. 3C, powder is left in the gap d0 between the top surface of the fabrication table 4 and the bottom surface of the modeled article 11a, the gap d0 between the top surface of the plate-shaped support 23a and the bottom surface of the modeled article 11b, and the gap d0 between the top surface of the plate-shaped support 23b and the bottom surface of the modeled article 11c, but powder in the other portions is removed.

Thus, as illustrated in FIG. 3C, there is no need of worrying damage caused by the contacting of three modeled article s 11a to 11c. That is, in order from the upside, the modeled article 11a is extracted, the modeled article 11b is extracted by removing the plate-shaped support 23b and the columnar supports 24b and 25b, and the modeled article 11a is extracted by removing the plate-shaped support 23a and the columnar supports 24a and 25a.

In this way, according to the three-dimensional modeled object of the first embodiment, for example, even when the modeled articles are formed in an overlapping state in the height direction, it is possible to prevent damage caused by the contacting of the modeled articles or the falling of the modeled article s when the powder is removed.

Moreover, since the modeled article is detached by the powder layer of the fabrication table or the plate-shaped support, it is possible to reduce a burden on a worker who acquires the modeled article or removes the powder. For example, when the three-dimensional layered modeling apparatus using the melted metallic powder is used, there is no need of cutting a metal portion since the powder is provided between the modeled article and the support.

FIGS. 4A to 4D are diagrams illustrating a modified example of a three-dimensional modeled object illustrated in FIGS. 3A to 3C, and FIGS. 4A to 4D are diagrams illustrating modified examples of FIG. 3B. Hereinafter, a difference from the three-dimensional modeled object illustrated in FIG. 3B will be described.

Figure 4A:
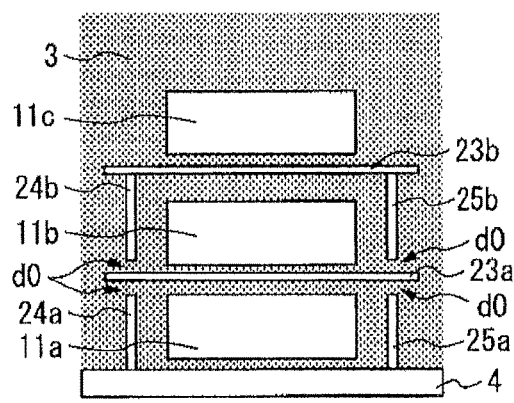
FIGS. 4A to 4D are diagrams illustrating a modified example of the three-dimensional modeled object illustrated in FIGS. 3A to 3C.
Figure 4B:
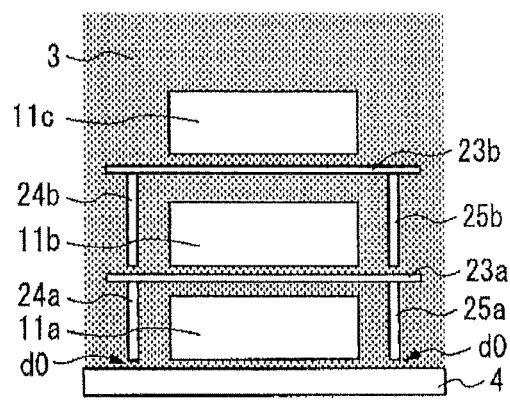

In the three-dimensional modeled object illustrated in FIG. 4A, the columnar supports 24b and 25b are integrally formed with the upper plate-shaped support 23b. Further, in the three-dimensional modeled object illustrated in FIG. 4B, the columnar supports 24a and 25a are integrally formed with the upper plate-shaped support 23a. In addition, in the three-dimensional modeled object illustrated in FIG. 4B, the gap d0 is formed between the top surface of the fabrication table 4 and the bottom surfaces of the columnar supports 24a and 25a.

Figure 4C:
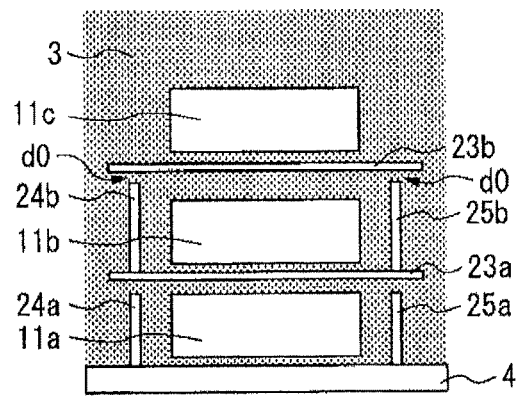
Figure 4D:
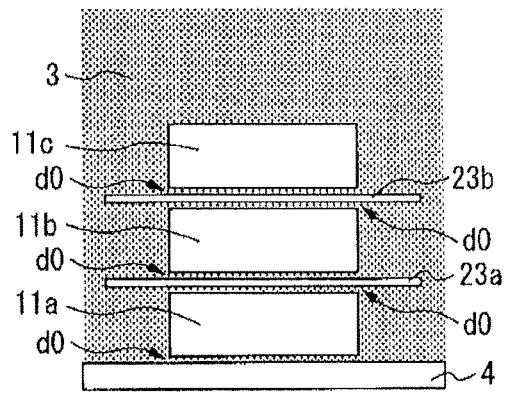

Further, in the three-dimensional modeled object illustrated in FIG. 4C, the columnar supports 24b and, 25b are integrally formed with the lower plate-shaped support 23a, and in the three-dimensional modeled object illustrated in FIG. 4D, only the plate-shaped supports 23a and 23b are provided instead of forming the columnar supports 24a, 24b, 25a, and 25b. In addition, the gap d0 is formed among the fabrication table 4, the plate-shaped supports 23a and 23b, and the modeled article s 11a to 11c.

Figure 5:
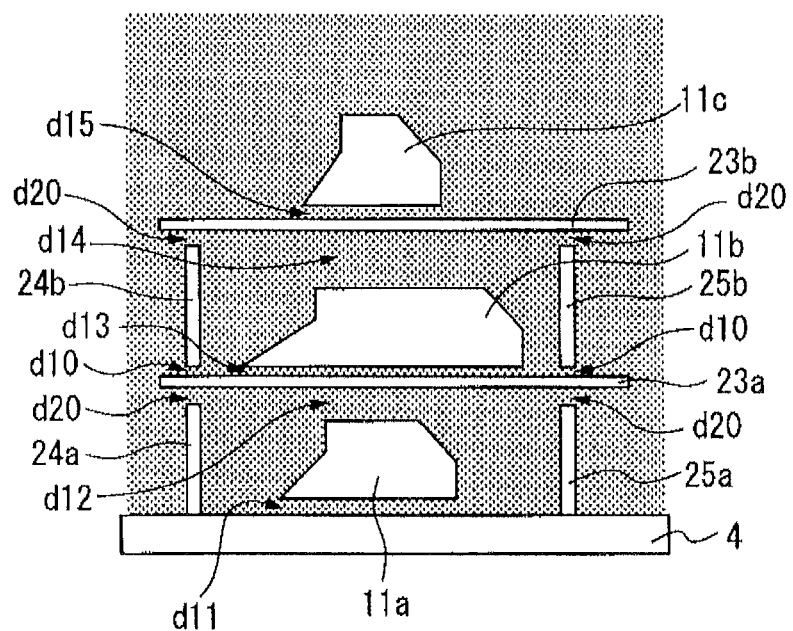
FIG. 5 is a diagram illustrating another modified example of the three-dimensional modeled object illustrated in FIGS. 3A to 3C.

FIG. 5 is a diagram illustrating still another modified example of the three-dimensional modeled object illustrated in FIGS. 3A to 3C and illustrating a case where the modeled article s 11a to 11c have different shapes. As illustrated in FIG. 5, the modeled articles 11a to 11c do not need to have the same shape and may have different shapes.

Further, the gaps among the modeled article s 11a to 11c, the fabrication table 4, and the plate-shaped supports 23a and 23b can be also changed variously. For example, an offset layer of a gap d11 is formed by powder between the top surface of the fabrication table 4 and the bottom surface of the modeled article 11a, an offset layer of a gap d13 is formed by powder between the top surface of the plate-shaped support 23a and the bottom surface of the modeled article 11b, and an offset layer of a gap d15 is formed between the top surface of the plate-shaped support 23b and the bottom surface of the modeled article 11c.

The thicknesses d11, d13, and d15 of the offset layer may be set to, for example, 1 mm or less. However, the thicknesses can be set to different values in consideration of, for example, the depression to the powder layer due to the shape or the weight of the modeled article. Generally, the excessive hardening of the modeled article occurs downward in the Z-axis direction (the height direction).

Here, in the examples illustrated in FIG. 5, the thicknesses d11, d13, and d15 of the offset layers of the modeled articles 11a to 11c are set to be equal to or slightly larger than a gap d20 between each of the top surfaces of the columnar supports 24a, 25a, 24b, and 25b and each of the bottom surfaces of the plate-shaped support 23a and 23b (d11=d13=d15≥d20), and a gap d10 between each of the bottom surfaces of the columnar supports 24b and 25b and the top surface of the plate-shaped support 23a is set to be slightly larger than the gap d20 (d10>d20).

In addition, a gap d12 between the top surface of the modeled article 11a and the bottom surface of the plate-shaped support 23a and a gap d14 between the top surface of the modeled article 11b and the bottom surface of the plate-shaped support 23b is set to be sufficiently larger than the offset layers (d11, d13, d15).

In this way, for example, the modeled articles formed in the same three-dimensional modeled object may have the same shape, but may have different shapes. Further, a gap between the modeled article and the support can be set to various values if necessary.

Figure 6A:
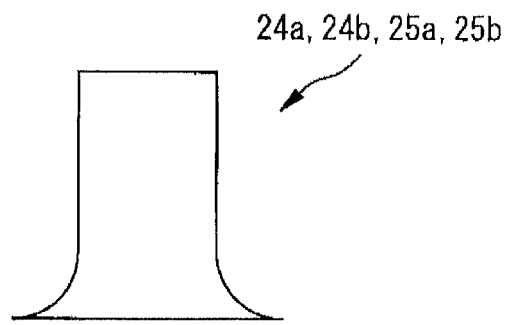
FIGS. 6A to 6C are diagrams illustrating an example of a support shape used in the invention.
Figure 6B:
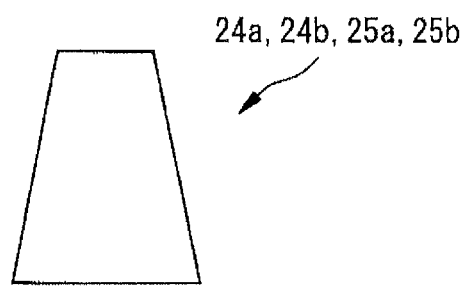
Figure 6C:
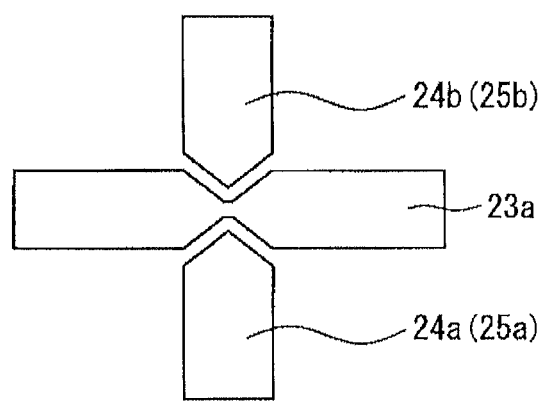

FIGS. 6A to 6C are diagrams illustrating an example of a support shape used in the invention, where FIGS. 6A and 6B illustrate a modified shape of the columnar support, and FIG. 6C illustrates a modified example of a connection portion between the plate-shaped support and the columnar support.

That is, as illustrated in FIGS. 6A and 6B, the columnar supports 24a, 24b, 25a, and 25b are not formed in columnar shapes. For example, a shape may be formed in which the bottom surface is widened so that the support is stable with respect to the lower fabrication table 4 and the plate-shaped support 23a when the powder is removed.

Moreover, for example, the lower and upper columnar supports 24a and 24b and the plate-shaped support 23a are tapered so that the supports appropriately engage with one another when the powder is removed.

In addition, the columnar support does not need to be formed in a columnar shape. For example, the columnar support may be formed in a bar shape having a square or polygonal shape or a plate shape. Further, the columnar supports may be provided at a required position instead of four corners of the plate-shaped support. In this way, the shape or the number of the support can be modified variously.

In the description above, the invention is not limited to a case where the support is used to overlap the modeled articles. For example, even when the post-process of the modeled article is automatically performed or the modeled article has an unstable shape, an appropriate shape is used in consideration of a decrease in damage of the modeled article or a decrease in burden of a worker.

Further, the invention is not limited to a case where the support is used to form the modeled article by applying the binding agent to the powder surface. For example, the invention is not limited to the three-dimensional layered modeling apparatus using the powder bed and inkjet head 3D printing method. For example, the invention is applied to various three-dimensional layered modeling apparatus es including the three-dimensional layered modeling apparatus using the metallic powder melting method. Further, the support can be widely applied to the three-dimensional layered modeling apparatus that forms the modeled article by using the non-fluid material as the shaping material as well as the three-dimensional layered modeling apparatus using the powdery molding method.

For example, in the three-dimensional layered modeling apparatus using the metallic powder melting method, the density is high when the metallic powder is melted. For this reason, the support may be used to prevent the deformation (the undercut) caused by the yield of the weight. Alternatively, the support may be used to prevent the deformation (bending) caused in the thin portion of the modeled article.

Figure 7A:
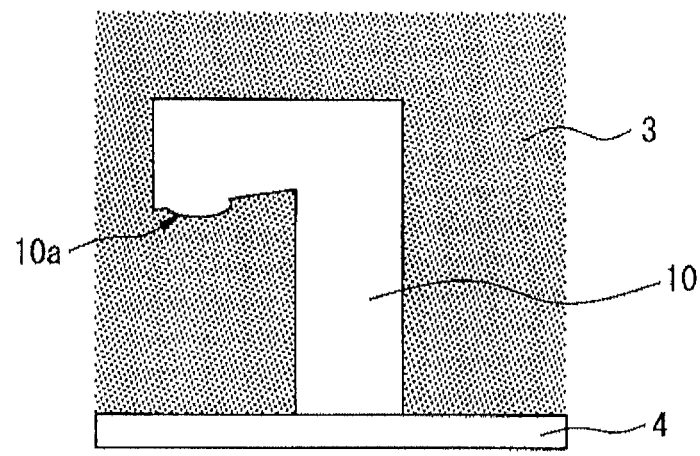
FIGS. 7A to 7C are diagrams illustrating a second embodiment of the three-dimensional modeled object according to the invention for the comparison with the related art.
Figure 7B:
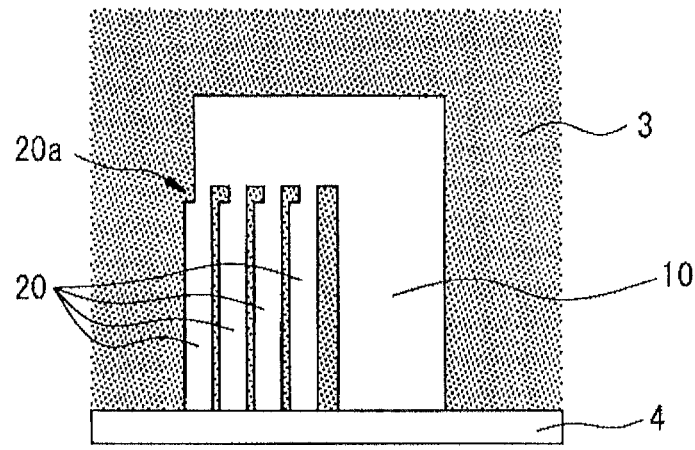
Figure 7C:
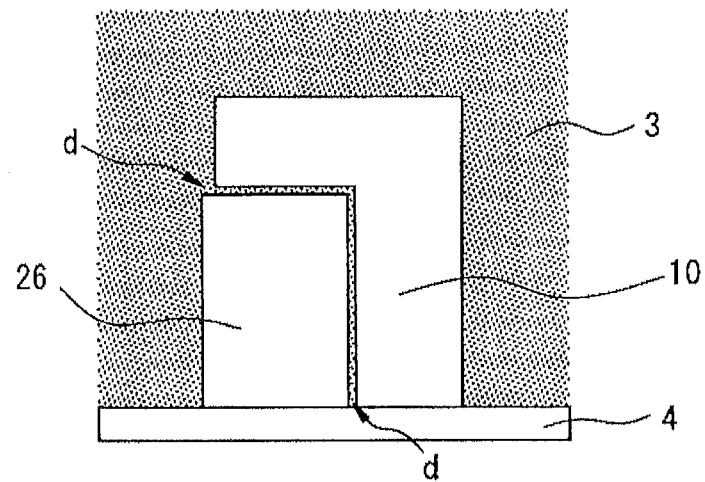

FIGS. 7A to 7C are diagrams used to compare a second embodiment of the three-dimensional modeled object according to the invention with the related art, where FIG. 7A illustrates a state where undercut occurs and FIG. 7B illustrates a support corresponding to the description of FIGS. 2A and 2B.

Further, FIG. 7C illustrates the second embodiment of the three-dimensional modeled object according to the invention. In addition, in FIGS. 7A to 7C, Reference Numeral 3 indicates powder, Reference Numeral 4 indicates a fabrication table, Reference Numeral 10 indicates a modeled article having a large upper portion and an overhanging portion, and Reference Numerals 20 and 26 indicate supports.

As described above, for example, in the three-dimensional layered modeling apparatus using the metallic powder melting method, there is a concern that the undercut may occur. That is, FIG. 7A illustrates a state where the undercut occurs, and FIG. 7B illustrates a case where the modeled article and the support are integrally formed with each other as described above by referring to FIGS. 2A and 2B.

As illustrated in FIG. 7B, when the modeled article 10 is formed so that an undercut 10a illustrated in FIG. 7A does not occur, for example, a plurality of supports 20 having a small (thin) connection portion 20a with respect to the modeled article 10 can be used. However, even in this case, an operation of removing the support 20 (20a) is necessary when the completed modeled article 10 is extracted.

On the contrary, in the three-dimensional modeled object of the second embodiment, as illustrated in FIG. 7C, a support 26 is formed below the overhanging portion of the modeled article 10 with a gap d interposed therebetween (in the longitudinal direction). In addition, a gap d is also formed between the modeled article 10 and the support 26 in the lateral direction. That is, in the three-dimensional modeled object, the modeled article 10 contacts the support 26 through the powder layer of the gap d.

Here, since the gap d between the overhanging portion of the modeled article 10 and the support 26 corresponds to, for example, one to several powder layers (for example, 1 mm or less) which are sequentially coated, the undercut of the modeled article 10 does not occur. Further, since the powder layer of the gap d exists between the modeled article 10 and the support 26, the completed modeled article 10 can be easily extracted.

In addition, a gap between the overhanging portion of the modeled article 10 and the support 26 in the longitudinal direction does not need to be equal to a gap between the modeled article 10 and the support 26 in the lateral direction. Further, the gap d is not limited to 1 mm or less. Thus, an appropriate thickness is selected depending on the shape or the material of the modeled article 10 or the material or the type of the powder used by the three-dimensional layered modeling apparatus.

Figure 8A:
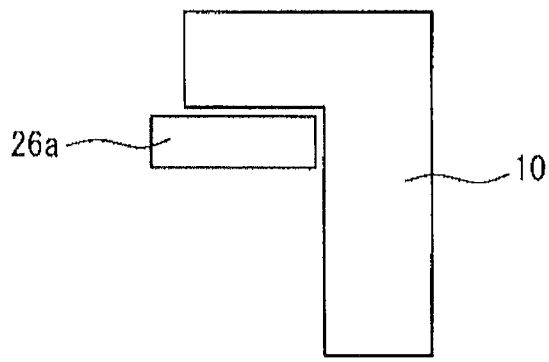
FIGS. 8A to 8C are diagrams illustrating a modified example of a support shape obtained when forming a modeled article illustrated in FIGS. 7A to 7C.
Figure 8B:
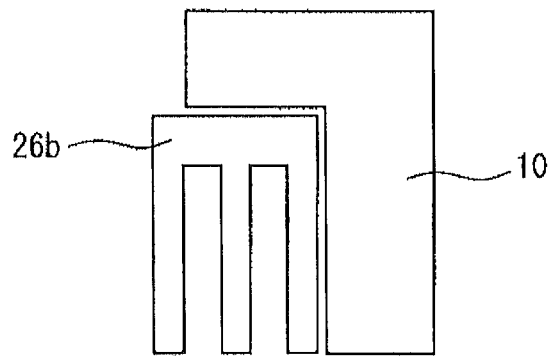
Figure 8C:
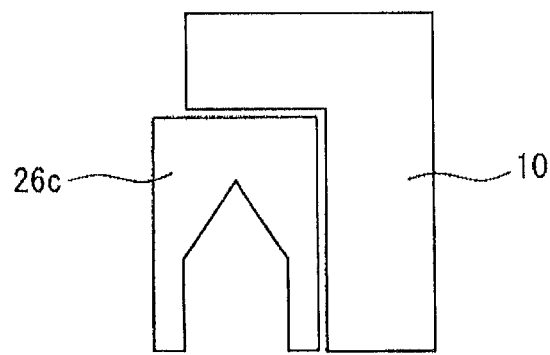

FIGS. 8A to 8C are diagrams illustrating a modified example of the support shape when the modeled article illustrated in FIGS. 7A to 7C are formed, and FIGS. 8A to 8C illustrate a modified example of the support 26 illustrated in FIG. 7C.

That is, a support 26a illustrated in FIG. 8A is provided below the overhanging portion of the modeled article 10 only by a predetermined thickness compared to the case where the support 26 of FIG. 7C is formed entirely from the bottom surface (the fabrication table 4) of the modeled article 10.

Further, in supports 26b and 26c illustrated in FIGS. 8B and 8C, a hollow portion is provided inside the support 26 of FIG. 7C so as to recycle the powder therein. In this way, the support 26 illustrated in FIG. 7C can be also modified variously.

Figure 9A:
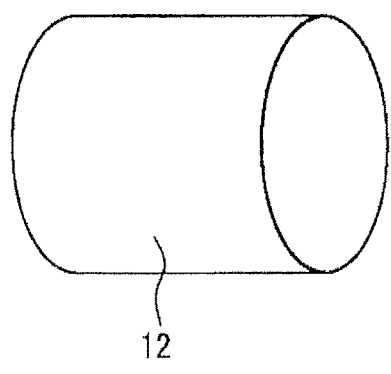
FIGS. 9A and 9B are diagrams illustrating another example of the modeled article used in the invention.
Figure 9B:
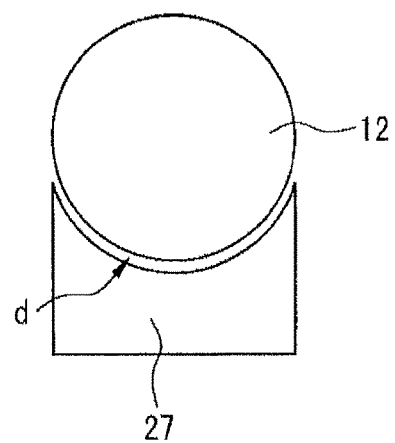

In the description above, the modeled articles 11a to 11c and 10 are formed in a rectangular shape (a rectangular parallelepiped shape and a combination of a rectangular parallelepiped shape having an overhanging portion), but the modeled article may have various shapes. FIGS. 9A and 9B are diagrams illustrating another example of the modeled article applied to the invention, where FIG. 9A is a perspective view illustrating a modeled article 12 and FIG. 9B is a diagram illustrating the modeled article 12 and a support 27.

As illustrated in FIGS. 9A and 9B, for example, when the modeled article 12 is formed in a columnar shape, the support 27 is formed in a shape in which a predetermined gap d is formed between the support and the columnar modeled article 12.

Figure 10A:
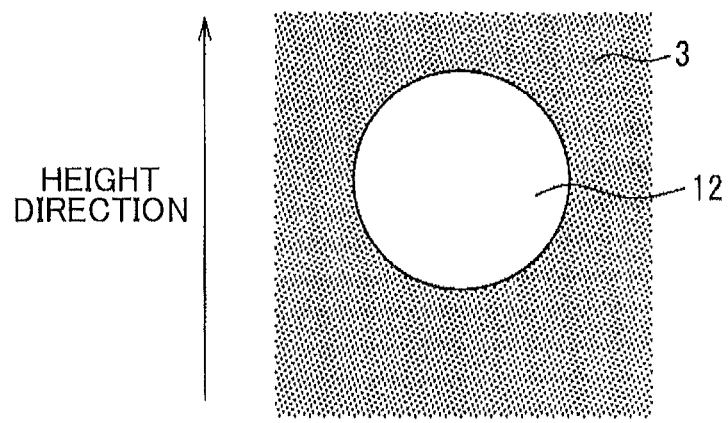
FIGS. 10A to 10C are diagrams illustrating a three-dimensional modeled object including the modeled article illustrated in FIGS. 9A and 9B used for the comparison between the related art and the embodiment.
Figure 10B:
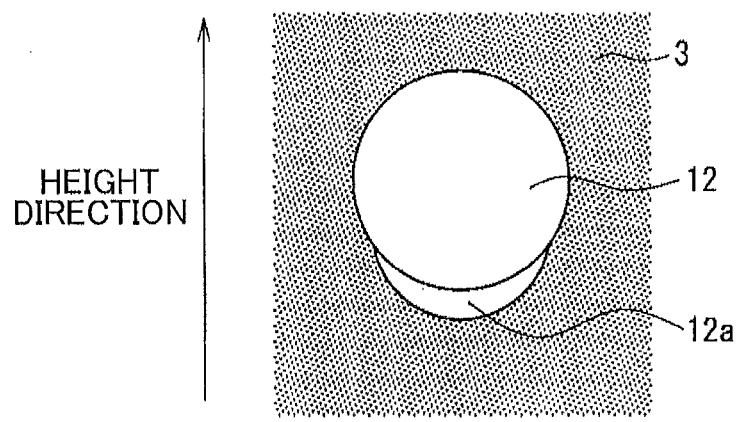
Figure 10C:
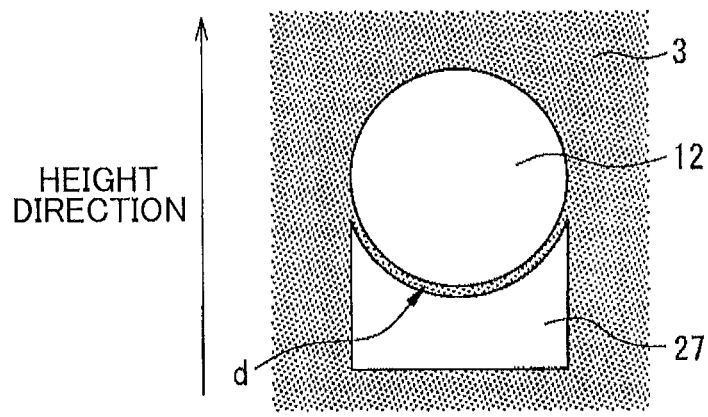

FIGS. 10A to 10C are diagrams illustrating a three-dimensional modeled object including the modeled article illustrated in FIGS. 9A and 9B used for the comparison between the related art and the embodiment. Here, FIG. 10A illustrates an ideal case, FIG. 10B illustrates an actual case, and FIG. 10C illustrates a case where the embodiment is used.

As illustrated in FIGS. 10A and 10B, for example, when the columnar modeled article 12 is formed (shaped) in the powder 3, an undercut 12a is formed at the lower portion of the modeled article 12 when the support is not used in actual. Here, in the three-dimensional modeled object of the embodiment, as illustrated in FIG. 10C, the support 27 having a shape corresponding to the modeled article 12 is formed below the columnar modeled article 12 with a predetermined gap d interposed therebetween.

Figure 11A:
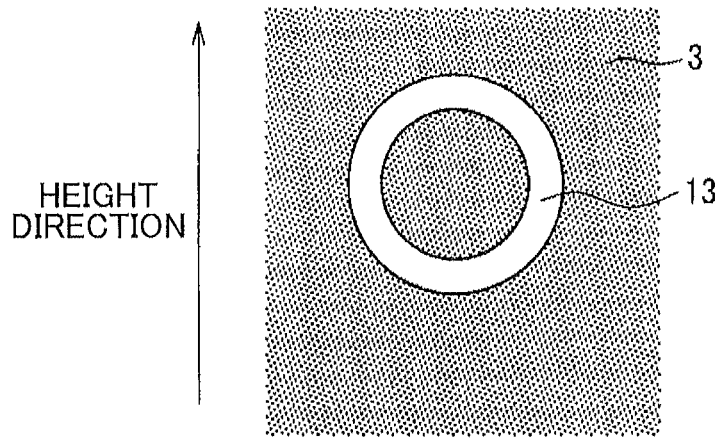
FIGS. 11A to 11C are diagrams illustrating a three-dimensional modeled object further including the modeled article used in the invention for the comparison between the related art and the embodiment.
Figure 11B:
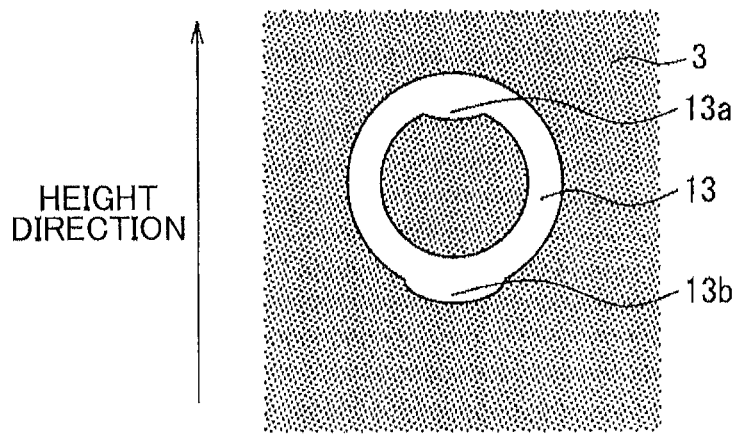
Figure 11C:
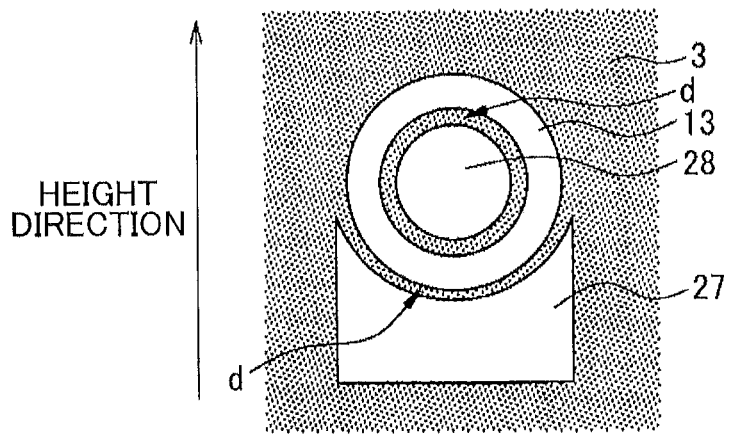

FIGS. 11A to 11C are diagrams illustrating a three-dimensional modeled object further including the modeled article used in the invention for the comparison between the related art and the embodiment. Here, FIG. 11A illustrates an ideal case, FIG. 11B illustrates an actual case, and FIG. 11C illustrates a case where the embodiment is used. That is, FIGS. 11A to 11C illustrate a case where the columnar modeled article 12 of FIGS. 10A to 10C is changed to a cylindrical (tubular) modeled article 13.

As illustrated in FIGS. 11A and 11B, for example, if the support is not used when the cylindrical modeled article 13 is formed in the powder 3, an undercut 13a occurs at the lower portion of the inner surface of the modeled article 13, and an undercut 13b occurs at the lower portion of the outer surface of the modeled article 13.

Here, in the three-dimensional modeled object of the embodiment, as illustrated in FIG. 11C, the support 27 having a shape corresponding to the outer surface of the modeled article 12 is formed below the outer surface of the cylindrical and columnar modeled article 12 with a predetermined gap d interposed therebetween similarly to FIG. 10C. Further, a support 28 having a shape corresponding to the inner surface of the cylindrical modeled article 12 is formed below the inner surface of the cylindrical and columnar modeled article 12 with a predetermined gap d interposed therebetween.

In this way, according to the three-dimensional modeled object of the embodiment, it is possible to prevent the undercut in the modeled article by forming the support having a corresponding shape below a portion which may have the undercut in various modeled article s with the predetermined gap d interposed therebetween.

In addition, since the powder layer of the gap d is interposed between the support and the modeled article, for example, the support is simply removed when the completed modeled article is extracted. Further, the mark of the support does not left in the modeled article, and for example, a post-processing such as polishing is not necessary. In addition, the advantage of the gap of the powder layer can be also obtained in the other embodiments.

Figure 12:
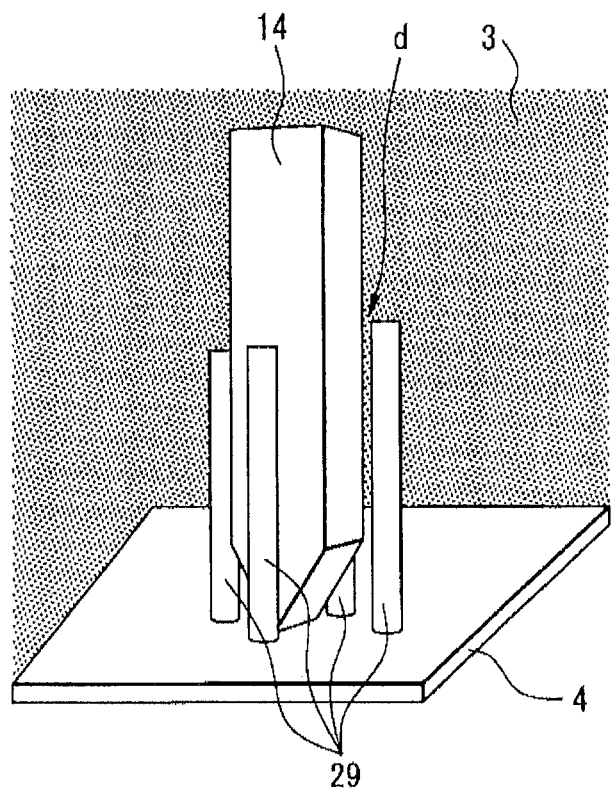
FIG. 12 is a diagram illustrating another example of a relation between a modeled article and a support.

FIG. 12 is a diagram illustrating another example of a relation between the modeled article and the support. As illustrated in FIG. 12, for example, when the lower end of the modeled article 14 has an acute angle so that the lower end is unstable, a support 29 can be used in order to hold the modeled article 14 having such a shape.

That is, for example, if there is a possibility of damage caused by the falling of the modeled article 14 when the powder 3 is removed from the three-dimensional modeled object, the support 29 can be provided so that the modeled article 14 does not fall even when the powder 3 is removed. For example, as the shape of the support 29, it is needless to say that various other shapes can be used as well as the shapes illustrated in FIGS. 6A and 6B.

Figure 13:
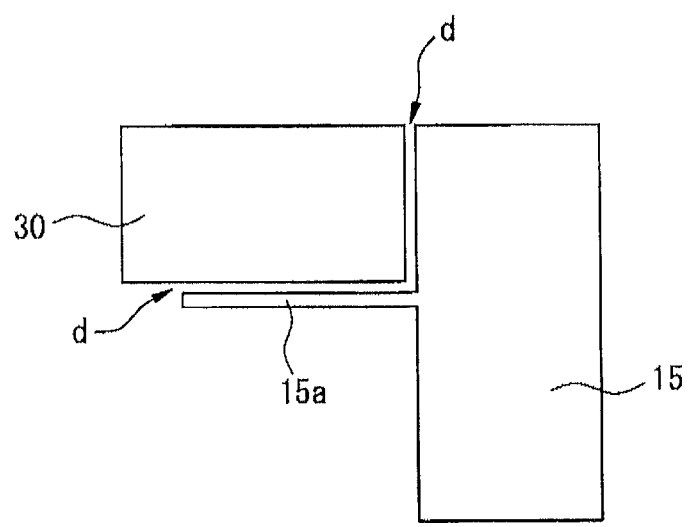
FIG. 13 is a diagram illustrating still another example of a relation between a modeled article and a support.

FIG. 13 is a diagram illustrating still another example of a relation between the modeled article and the support. As illustrated in FIG. 13, for example, when a modeled article 15 includes a thin plate-shaped portion 15a in the horizontal direction (X-Y plane), there is a concern that the plate-shaped portion 15a is bent upward when the support is not provided.

In FIG. 13, a support 30 is provided above the plate-shaped portion 15a with a predetermined gap d interposed therebetween in order to prevent the bending of the plate-shaped portion 15a. In addition, for example, when the weight of the support 30 matters, the other supports make it possible to prevent the weight of the support 30 influencing the thin plate-shaped portion 15a of the modeled article 15 even when the powder has been removed.

As described above, the invention can be applied to the three-dimensional layered modeling apparatus using various powders or the three-dimensional layered modeling apparatus using the metallic powder melting method as well as the three-dimensional layered modeling apparatus forming the modeled article by applying the binding agent onto the powder surface. Further, the invention is not limited to the three-dimensional layered modeling apparatus using the powdery molding method. For example, the invention is widely applied to the three-dimensional layered modeling apparatus that forms the modeled article by using a non-fluid material including powder, wax, jelly, and sol as a shaping material.

While the embodiments have been described above, all examples or conditions described herein are used to help the comprehension of the invention and the concept of the invention applied to the technique, and particularly the examples or conditions described do not limit the scope of the invention. Further, the description in the specification does not show the advantage and the disadvantage of the invention. While the embodiments of the invention have been described in detail, various changes, substitutions, or modifications can be, of course, made without departing from the spirit and the scope of the invention.

REFERENCE SIGNS LIST

3: powder
4, 141: fabrication table
21, 21a to 21c, 22, 22a to 22c, 23a, 23b, 24a, 24b, 25a, 25b, 26a to 26c, 27 to 29: support
10, 11a to 11c, 12 to 15: modeled article
100: three-dimensional layered modeling apparatus
101: control computer
102: print head unit
103: recoater unit
104: fabrication tank
105: elevation device
106: powder supply hopper unit
107: cleaning unit
108: chemical unit
131: recoater hopper
132: vibration blade

The invention claimed is:
1. A three-dimensional modeled object comprising:
a shaping material which is layered on a fabrication table;
a modeled article which is formed inside the shaping material; and
a support which is formed inside the shaping material and is formed with a predetermined gap in a vertical Z-direction with respect to the modeled article,
wherein the support includes a plate-shaped support,
wherein the plate-shaped support has an area in a plane defined by horizontal X and Y directions larger than that of the modeled article, and
wherein the gap between the support and the modeled article is equal to or smaller than about 1 mm.
2. The three-dimensional modeled object according to claim 1, wherein a plurality of the modeled articles is formed in the height direction, and wherein the plate-shaped support is provided between two modeled articles adjacent to each other in the height direction.

3. The three-dimensional modeled object according to claim 1, wherein the support has a shape corresponding to the shape of the modeled article.

4. The three-dimensional modeled object according to claim 1, further comprising: an offset layer which is formed by the shaping material between the fabrication table and the modeled article formed on the fabrication table.

5. The three-dimensional modeled object according to claim 1, wherein the support has the same composition as the modeled article.

6. The three-dimensional modeled object according to claim 1, wherein the shaping material includes a non-fluid material including powder, wax, jelly, or sol.

7. The three-dimensional modeled object according to claim 6, wherein the shaping material is the powdery non-fluid material, and wherein the three-dimensional modeled object is formed by a three-dimensional layered modeling apparatus using a powdery molding method including a powder sintering method, a powder melting method, or a powder bed and inkjet head 3D printing method.

8. A support forming method of a three-dimensional layered modeling apparatus that carries out repeatedly a process of coating one layer of a shaping material onto a fabrication table and a process of forming one layer of a modeled article by processing the coated shaping material, wherein, when one layer of the modeled article is formed, a support is formed with a predetermined gap in a vertical Z-direction with respect to the modeled article, wherein the support includes a plate-shaped support, wherein the plate-shaped support has an area in a plane defined by horizontal X and Y directions larger than that of the modeled article, and wherein the gap between the support and the modeled article is equal to or smaller than about 1 mm.

9. The support forming method according to claim 8, wherein an offset layer is formed by the shaping material between the fabrication table and a modeled article formed on the fabrication table.

10. The support forming method according to claim 8, wherein the support has the same composition as the modeled article.

11. The support forming method according to claim 8, wherein the shaping material includes a non-fluid material including powder, wax, jelly, and sol.

12. The support forming method according to claim 11, wherein the shaping material is the powdery non-fluid material, and wherein the support forming method is applied to a three-dimensional layered modeling apparatus that uses a powdery molding method including a powder sintering method, a powder melting method, or a powder bed and inkjet head 3D printing method.

* * * * *